March 21, 1950 B. R. CARSON 2,501,312

PHONOGRAPH TURNTABLE SPINDLE

Filed April 10, 1946

INVENTOR.

Benjamin R. Carson

BY

C. D. Tuska

ATTORNEY

Patented Mar. 21, 1950 2,501,312

UNITED STATES PATENT OFFICE 2,501,312

PHONOGRAPH TURNTABLE SPINDLE

Benjamin R. Carson, Haddonfield, N. J., assignor to Radio Corporation of America, a corporation of Delaware Application April 10, 1946, Serial No. 661,143

8 Claims. (Cl. 274—10)

Figures 1, 2, 3, 4, 5:
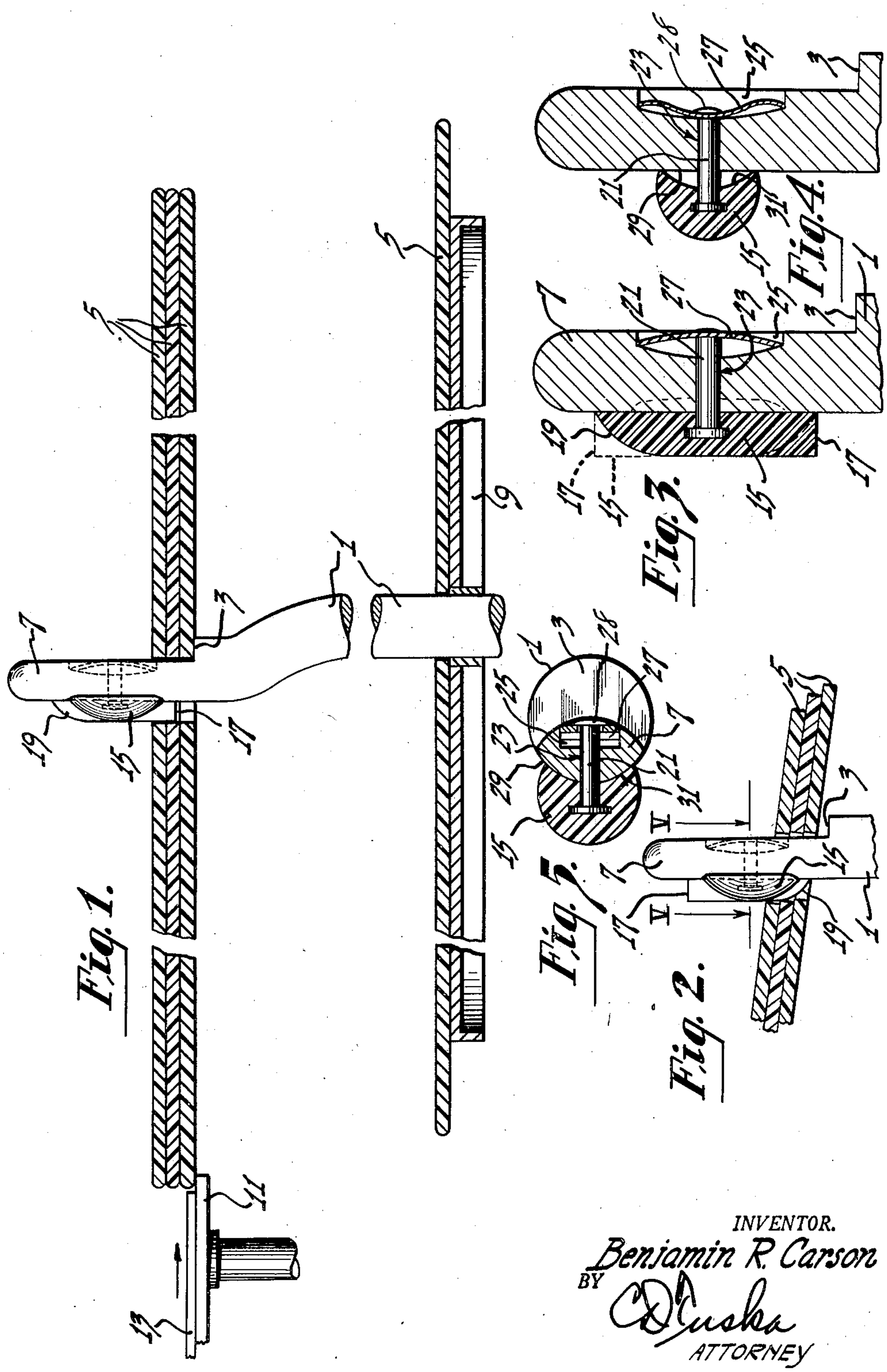

This invention relates to phonograph turntable spindles, and more particularly to spindles for those drop type automatic phonographs in which the unplayed records of a stack are supported adjacent their centers upon a shoulder on the spindle and adjacent their peripheries upon a supporting member at one side of the turntable.

In phonographs of this type, the spindles are arranged with a stack detaining member above the record supporting shoulder for holding back all of the records of the stack except the lowermost one while the lowermost record is being shifted laterally off of the supporting shoulder on the spindle to free it from the stack so that it can slide down along the spindle to the turntable. Since the stack detaining member is offset with respect to the body of the spindle, a problem is presented when the played records are to be removed from the turntable. As one solution for this problem, it has been proposed to make the spindle removable from the turntable so that, when the played records are to be removed, the spindle is first withdrawn, after which the records can be lifted freely. However, there are a number of objections to the use of a removable spindle. It has also been proposed to arrange the stack detaining member in a manner such that it will yield in response to pressure applied by the played records as they are raised from the turntable. Spindles of this type which have been proposed previously have also been subject to a number of objections.

The primary object of my present invention is to provide an improved phonograph turntable spindle for the form of drop type phonographs indicated above which will be free from the objections found in similar, prior art spindles.

More particularly it is an object of my present invention to provide an improved phonograph turntable spindle for drop type, automatic phonographs which may be mounted in a fixed position concentric with the turntable and which need not be removed to enable removal of the played records.

It is also an object of my present invention to provide an improved phonograph turntable spindle as aforesaid which will incorporate a detaining member for the unplayed records of the stack but which will, nevertheless, permit free and easy removal of all of the played records along the entire length of the spindle notwithstanding such detaining member.

Another object of my present invention is to provide an improved phonograph turntable spindle of the type set forth above in which the record stack detaining member can be easily and quickly adjusted from detaining position to a second position in which it will permit the free and unobstructed movement of the played records along the entire length of the spindle when it is desired to remove the played records from the turntable.

Still another object of my present invention is to provide an improved phonograph turntable spindle as aforesaid which will not injure the records either during the transference thereof from the stack to the turntable, or during removal thereof from the turntable.

A further object of my present invention is to provide an improved phonograph turntable spindle as aforesaid which is very simple in construction, which can be easily fabricated, which is economical in cost, and which is highly efficient in use.

In accordance with my present invention, I form the spindle with a shank portion which is adapted to be mounted in fixed, concentric relation with the turntable and which is provided with a record supporting shoulder on which the lowermost record of a stack of unplayed records can rest. The spindle is also provided with a head portion which extends beyond or above the aforementioned shoulder in offset relation with respect to the shoulder. Rotatably mounted on the side of the head portion opposite the aforementioned record supporting shoulder is a record detaining member which is formed with a butt end and with a tapered end at its opposed extremities. The record detaining member also has an intermediate portion which has a shape complemental to that of the adjacent side of the spindle head portion, and it is constantly urged into firm engagement with the head portion by a suitable spring associated therewith.

The record detaining member is so mounted on the head portion that it can be rotated through 180° in either direction to bring either its butt end or its tapered end into proximity with the record supporting shoulder on the spindle. When the record detaining member is arranged so that its butt end is in proximity to the aforementioned shoulder, the butt end is then spaced above the shoulder a distance just slightly greater than the thickness of a conventional disc record. Hence, the then lowermost record of the stack which is resting on the spindle shoulder can be moved laterally by any suitable ejector mechanism, many of which are well known in the prior art, to push that record off of the spindle shoulder and thereby free it from the stack so that it can slide down along the spindle shank portion toward the turntable. At the same time, the butt end of the record detaining member will prevent the next higher record of the stack (and therefore all the remaining records of the stack) from being moved laterally along with the lowermost record.

The tapered end of the record detaining member is preferably formed on a suitable curve or incline which tapers gradually away from the adjacent side of the spindle head portion and terminates at substantially a point adjacent said head portion. Hence, when the record detaining member is turned 180° to bring its tapered end into proximate relation with the record supporting shoulder of the spindle, it will be apparent that this tapered end will offer no obstruction to the movement of the played records along the spindle head portion, so that the played records can then be moved freely along the entire length of the spindle when they are raised from the turntable. Thus, free and easy removal of the played records can be accomplished by merely turning the record detaining member the necessary 180° and then lifting the played records from the turntable upwardly along the entire length of the spindle.

The novel features of my invention, as well as additional objects and advantages thereof, will better be understood from the following description of one embodiment thereof, when read in connection with the accompanying drawing, in which Figure 1 is a side elevation, partly in section, of a phonograph embodying one form of spindle constructed in accordance with my present invention and showing the record detaining member with its butt end in proximity to the record supporting shoulder of the spindle, Figure 2 is a fragmentary, side elevation of the spindle of Figure 1 but showing the record detaining member with its tapered end in proximity to the record supporting shoulder, Figure 3 is an enlarged sectional view taken substantially longitudinally through the head portion of the spindle, Figure 4 is a view similar to Figure 3 but showing the record detaining member turned 90° from the position illustrated in Figure 3, and Figure 5 is an enlarged sectional view taken along the plane of the line V—V of Figure 2.

Referring more particularly to the drawing wherein similar reference characters designate corresponding parts throughout, there is shown a spindle having a shank portion 1 formed with a shoulder 3 on which the lowermost record of a stack of records 5 may rest, the spindle being also provided with a head portion 7 which is offset relative to the shank portion 1. The shank 1 is adapted to be arranged in a fixed or stationary position concentrically with the turntable 9 on which the records 5 may rest during playing. The unplayed records of the stack are supported above the turntable 9 adjacent their center holes upon the spindle shoulder 3 and adjacent their peripheries by a suitable supporting member 11. To free each successive, lowermost record of the stack for dropping toward the turntable, a suitable slide 13 may be provided in conjunction with the support 11. When the slide 13 is moved to the right, as shown by the appended arrow in Figure 1, the lowermost record is moved laterally to the right to move it off of ths shoulder 3 whereupon it becomes free to slide down along the shank 1 onto the turntable or onto the records which were previously dropped thereonto.

To prevent all but the lowermost record of the stack from moving laterally upon movement of the slide 13, there is provided a record detaining member 15 which has a butt end 17 and a gradually curved or tapered end 19 at its opposite extremities, the tapered end 19 being preferably, but not necessarily, so formed that it terminates substantially in a point. The member 15 is rotatably mounted on the side of the spindle head 7 which is opposite the shoulder 3 by means of a pin or post 21 which extends loosely through a bore 23 in the spindle head in a direction normal to the axis of the spindle. The bore 23 communicates with a recess 25 in the spindle head opposite the detaining member 15. A suitable retaining spring 27, such as a leaf spring or a hairpin spring, which is seated in the recess 25 and embraces the pin 21, engages the enlarged terminal portion 28 of the pin 21 to constantly urge and hold the detaining member 15 against the adjacent side of the spindle head 7. It will be noted from Figure 5 that this side of the spindle head 7, which is opposite the record supporting shoulder 3, is formed transversely on an arc 29 and that the adjacent portion of the record detaining member 15 intermediate its ends 17 and 19 is formed transversely with a complemental curve 31 so that it can mate with the curved surface 29. Since the spring 27 is biased to constantly draw the record detaining member 15 into snug or firm engagement with the spindle head 7, it will be apparent that, when the record detaining member 15 is either in the position of Figure 1 (see also its solid line position in Figure 3), or in the position of Figure 2 (see also its dotted line position in Figure 3), the spring 27 will bring the surfaces 31 and 29 into mating relation and will releasably lock the member 15 in either of the two indicated positions. Inasmuch as the surface 29 of the spindle head 7 is curved on an arc, it will be a simple matter to turn the record detaining member 15 from one to the other of its two positions shown in Figure 3. As the detaining member 15 is turned manually, it will gradually move away from the spindle head 7 against the action of the spring 27. In the position 90° removed from either of the positions thereof shown in Figure 3, the member 15 will be in the position shown in Figure 4 from which it will be noted that the spring 27 has yielded. Continued rotation of the member 15 beyond the 90° position of Figure 4 will permit the spring 21 to move back to its original position of Figure 3 and thereby snap the detaining member back into firm engagement with the spindle head 7 as above described.

The record detaining member 15 is so located on the spindle head portion 7 that, when the member 15 is in the position shown in Figure 1, its butt end 17 will be in cooperative relation with the record supporting shoulder 3 and spaced from the shoulder 3 a distance thereabove which is just slightly greater than the thickness of a conventional record 5. Hence, when the slide 13 moves to the right, as viewed in Figure 1, the lowermost record 5 will be pushed laterally to the right to be moved off of the shoulder 3. This will release it from the stack so that it can slide down along the spindle shank portion 1 toward the turntable 9. At the same time, the butt end 17 of the member 15 will prevent lateral movement of the next higher record as well as those records above the latter one so that the records remaining in the stack will not follow the released, erstwhile lowermost record. The records remaining in the stack will then drop down to present a new lowermost record to the spindle shoulder 3, and this series of operations will be repeated for each cycle in well known manner until all of the records have been released and will have dropped down to the turntable.

Since the butt end 17 of the record detaining member 15 presents an obstruction to the facile removal of the played records from the turntable in an upward direction, it is necessary to remove the butt end 17 from the path of such records. Upon turning the member 15 through an angle of 180° in either direction from the position of Figure 1 to the position of Figure 2, the curved or tapered end 19 of the member 15 will be brought into proximate relation with the shoulder 3 and will then be presented to the played records. Consequently, as the played records are lifted along the spindle, when they reach and engage the tapered end 19, they will be cammed slightly to the left upon continued upward movement thereof to thereby clear the detaining member 15. Hence, they can be moved easily up along the entire length of the spindle without any difficulty. Thus, it is apparent that the tapered end 19 of the member 15 provides a substantially unobstructed path for the movement of played records along the entire length of the spindle when it is desired to remove these records from the turntable.

From the foregoing description it will undoubtedly be apparent to those skilled in the art that I have provided an improved spindle for drop type record changers which is free from many objections found in similar, prior art spindles, which need not be removed from the turntable to permit removal of played records, and which will permit removal of the played records in an easy and convenient manner. Although I have shown and described only a single embodiment of my present invention, it will undoubtedly be apparent to those skilled in the art that many other modifications thereof, as well as variations in that described above, are possible. I therefore desire that the foregoing shall be considered merely as illustrative and not as limiting.

I claim as my invention:

1. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, and a record detaining member movably mounted on said head portion on the side thereof opposite said shoulder, said member having a butt portion and a tapered portion and being so mounted on said head portion that it is movable to present either said butt portion or said tapered portion in proximity to said shoulder, said butt portion, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

2. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, and a record detaining member rotatably mounted on said head portion on the side thereof opposite said shoulder, said member having a butt end and a tapered end and being rotatable on its rotary axis to present either said butt end or said tapered end in proximity to said shoulder, said butt end, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

3. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, and a record detaining member mounted externally for movement in a vertical arc on the side of said head portion opposite said shoulder, said member having a butt portion and a tapered portion and being so mounted on said head portion that it is movable to present either said butt portion or said tapered portion in proximity to said shoulder, said butt portion, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

4. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, and a record detaining member having means formed on one surface thereof for longitudinally aligning said member with said head portion, said member having a butt portion and a tapered portion and being so mounted on said head portion that it is movable to present either said butt portion or said tapered portion in proximity to said shoulder, said butt portion, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

5. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, a record detaining member rotatably mounted on said head portion on the side thereof opposite said shoulder, said member having a butt end and a tapered end and being rotatable on its rotary axis to present either said butt end or said tapered end in proximity to said shoulder, and means for releasably holding said member firmly on said head portion with either said butt end or said tapered end in proximity to said shoulder, said butt end, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

6. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, a record detaining member rotatably mounted on said head portion on the side thereof opposite said shoulder, said member having a butt end and a tapered end and being rotatable on its rotary axis to present either said butt end or said tapered end in proximity to said shoulder, said member and said head portion having adjacent surface portions which are complemental to each other and are arranged to be disposed in mating relation when said detaining member is either in a first position wherein its said butt end is in proximity to said shoulder or in a second position wherein its said tapered end is in proximity to said shoulder, and yieldable means tending constantly to hold said member firmly against said head portion to thereby releasably lock said member on said head portion in either of its said positions, said butt end, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

7. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, the side of said head portion opposite said shoulder being formed transversely on a curve, a record detaining member rotatably mounted on said head portion on the side thereof opposite said shoulder, the adjacent side of said detaining member being formed between said butt end and said tapered end transversely on a complemental curve whereby said detaining member is adapted to be disposed in mating relation with said head portion when said detaining member is either in a first position wherein its said butt end is in proximity to said shoulder or in a second position wherein its said tapered end is in proximity to said shoulder, and yieldable means tending to constantly hold said member firmly against said head portion to thereby releasably lock said member on said head portion in either of its said positions, said member having a butt end and a tapered end and being rotatable on its rotary axis to present either said butt end or said tapered end in proximity to said shoulder, said butt end, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

8. A turntable spindle for automatic phonographs which comprises a shank portion adapted to be mounted in concentric relation with the turntable, said shank portion having a record supporting shoulder thereon, a head portion, having a recess therein, beyond said shoulder for reception of a stack of unplayed records the lowermost one of which may rest on said shoulder, a record detaining member rotatably mounted on said head portion on the side thereof opposite said shoulder, a pin secured to said member and extending through said head portion into said recess, and resilient means connected to said pin and disposed in said recess to constantly urge said member against said head portion, said member having a butt end and a tapered end and being rotatable on its rotary axis to present either said butt end or said tapered end in proximity to said shoulder, said butt end, when in proximity to said shoulder, being spaced therefrom a distance somewhat greater than the thickness of a record whereby said lowermost record may be moved laterally off of said shoulder to enable it to slide down along said shank portion toward said turntable while said butt portion prevents lateral movement of the next higher record of the stack, and said tapered portion, when in proximity to said shoulder, presenting an unobstructed path for movement of played records along the entire length of said spindle upon removal thereof from said turntable.

BENJAMIN R. CARSON.

REFERENCES CITED

The following references are of record in the file of this patent:

UNITED STATES PATENTS

| Number | Name | Date |
|---|---|---|
| 2,287,098 | Habegger | June 23, 1942 |
| 2,331,383 | Faulkner | Oct. 12, 1943 |
| 2,374,080 | Dale | Apr. 17, 1945 |